United States Patent [19]

Horton

[11] 4,308,242
[45] Dec. 29, 1981

[54] PRODUCING SULFUR-CONTAINING COMPOSITIONS FROM GASEOUS SULFUR COMPOUNDS

[75] Inventor: Robert L. Horton, Bartlesville, Okla.

[73] Assignee: Phillips Petroleum Company, Bartlesville, Okla.

[21] Appl. No.: 114,922

[22] Filed: Jan. 24, 1980

[51] Int. Cl.³ .................. B01D 53/34; C01B 17/04
[52] U.S. Cl. ............................. 423/221; 423/222; 423/228; 423/230; 423/242; 423/244; 423/461; 423/567 R; 423/571; 423/573 G; 423/574 R; 423/575
[58] Field of Search ............... 423/220, 221, 222, 224, 423/225, 226, 228, 229, 230, 231, 242 A, 242 R, 243, 244 A, 244 R, 511, 511 A, 512, 514, 567, 567 A, 571, 573, 574–576, 517, 519, 520; 585/830

[56]  References Cited

U.S. PATENT DOCUMENTS

| | | | |
|---|---|---|---|
| Re. 4,998 | 7/1872 | Everett | 423/230 |
| 1,773,293 | 8/1930 | Benner et al. | 423/576 |
| 1,795,121 | 3/1931 | Hansen | 423/222 |
| 1,832,325 | 11/1931 | Rosenstein | 423/221 |
| 2,288,749 | 7/1942 | Scholze | 423/230 |
| 2,631,107 | 3/1953 | Leatherman | 106/307 |
| 2,652,344 | 9/1953 | Simms | 106/307 |
| 2,778,715 | 1/1957 | Austin | 423/461 |
| 2,796,327 | 6/1957 | Pollock | 423/375 |
| 2,881,047 | 4/1959 | Townsend | 423/222 |
| 2,987,379 | 6/1961 | Urban | 423/575 |
| 3,103,411 | 9/1963 | Fuchs | 423/224 |
| 3,170,766 | 2/1965 | Townsend | 423/222 X |
| 3,244,484 | 4/1966 | Johnson | 423/456 X |
| 3,248,252 | 3/1966 | Schirmer et al. | 106/307 |
| 3,528,840 | 9/1970 | Aboytes | 106/307 |
| 3,563,704 | 2/1971 | Torrence | 423/461 X |
| 3,725,531 | 4/1973 | Pearson et al. | 423/244 A |
| 3,770,010 | 12/1973 | Nicksic et al. | 423/573 |
| 3,773,912 | 11/1973 | Spangler, Jr. | 423/574 |
| 3,822,341 | 7/1974 | Smith | 423/574 G |
| 3,859,417 | 1/1975 | Teller | 423/230 |
| 3,939,250 | 2/1976 | Michel et al. | 423/574 R |
| 3,961,018 | 6/1976 | Williamson | 423/228 |
| 3,989,811 | 11/1976 | Hill | 423/573 G |
| 4,003,986 | 1/1977 | Lewis | 423/567 A |
| 4,012,486 | 3/1977 | Singleton | 423/230 |

OTHER PUBLICATIONS

"Reaction of Ammonia 2nd Aliphatic Amines With Sulfur Dioxide", Nature, vol. 203, Jul. 4, 1964 to Sep. 26, 1964, pp. 1378 & 1379.

Kirk-Othmer, Encyclopedia of Chemical Technology, vol. 2, p. 313, 2nd Edition, 1963, John Wiley & Sons, Inc.

*Primary Examiner*—Earl C. Thomas

[57]  ABSTRACT

At least one of sulfur dioxide and a gaseous hydrosulfide is contacted with at least one of a sulfur-containing salt and a gaseous basic nitrogen compound to produce a solid, sulfur-containing composition.

56 Claims, 6 Drawing Figures

PRODUCING SULFUR-CONTAINING COMPOSITIONS FROM GASEOUS SULFUR COMPOUNDS

FIELD OF THE INVENTION

This invention relates to a method of removing one or more gaseous contaminants from a gas stream. Such gaseous contaminants include for example gaseous sulfur compounds, gaseous nitrogen compounds and mixtures thereof. In another aspect, the invention relates to a method for removing one or more of the above-noted gaseous materials from carbon black smoke.

BACKGROUND OF THE INVENTION

Generating electrical power in the United States from high-sulfur coal requires that the stack gases be desulfurized to comply with governmental environmental regulations. Desulfurization is frequently accomplished by contacting the stack gases with an aqueous basic nitrogen compound, for example ammonia and/or amines. However, these materials must also be removed before the stack gases can be released to the atmosphere.

Removing sulfur-containing gases by a liquid phase reaction has proved to be unsatisfactory for a number of reasons. One of these reasons is that reaction in the liquid phase is slow and becomes even slower as build-up in the liquid phase system of the absorbed contaminants reduces the absorbing capacity of the system. Another disadvantage to liquid phase systems is that the boiling point of the solvent employed limits the range of operating temperatures at which the process can be carried out. Additionally, it is frequently difficult to dispose of or regenerate the contaminated liquid by-product.

OBJECTS OF THE INVENTION

An object of this invention is to provide a vapor-phase reaction for the production of solid compositions which contains sulfur.

Another object of the invention is the removal of various gaseous contaminants from a gas stream.

Another object of the invention is the removal of various sulfur-containing gases and/or various nitrogen-containing gases from gas streams.

Another object of this invention is the removal of $H_2S$, $SO_2$ or mixtures thereof from gas streams which contain these materials.

SUMMARY OF THE INVENTION

According to the invention, at least one gas selected from the group consisting of sulfur dioxide and a hydrosulfide is contacted with at least one material selected from the group consisting of a sulfur-containing salt and a gaseous basic nitrogen compound to produce solid, sulfur-containing compositions. In accordance with one embodiment of the invention, at least one gaseous material selected from the group consisting of sulfur dioxide, a hydrosulfide and a basic nitrogen compound is removed from a gas stream by determining the concentration in the gas stream of each of the materials and then adding to the stream at least one of the materials in an appropriate amount to react with at least one of the other materials present to form the solid sulfur-containing compositions. In another embodiment, the gas stream to be treated also contains carbon black smoke. In this embodiment, carbon black and the sulfur-containing compositions are collected from the stream and blended to provide a useful sulfur-carbon black mixture. In yet another embodiment of the present invention, at least one material selected from the group consisting of sulfur dioxide and a hydrosulfide is at least partially removed from a gas stream containing said at least one material by contacting the stream with a sulfur-containing salt, which can optionally be produced in situ by contacting the stream with a gaseous basic nitrogen compound.

BRIEF DESCRIPTION OF THE DRAWINGS

FIGS. 1 and 3 are also numbered correspondingly wherever possible.

DETAILED DESCRIPTION OF THE INVENTION

In accordance with the invention, at least one gas selected from the group consisting of sulfur dioxide and a hydrosulfide is contacted with at least one material selected from the group consisting of a sulfur-containing salt and a gaseous basic nitrogen compound to form a solid sulfur-containing composition. It has been found, surprisingly, that the solid sulfur-containing composition is produced with amazing rapidity by the above reaction over an extremely broad range of temperatures, pressures and reactant concentrations; and that water need not be present in order for the reaction to take place. In fact, it is preferred that any amount of water which may be present in the reaction environment is in an amount below the dew point for the pressure and temperature at which the reaction is carried out, in order to best avoid the corrosive effects that water solutions can cause to process equipment. It is believed that the non-aqueous nature of the chemical reactions involved in this invention coupled with the non-criticality of temperatures and pressures and reactant concentrations at which the reactions will occur will enable them to be adapted to a wide variety of plant applications.

A gas stream containing any amount of at least one of hydrosulfides, $SO_2$ and basic nitrogen compounds can be processed in the practice of this invention to decrease its content of any or all of these compounds. For example, stack gases, Claus unit tail gas, sour natural gas, gases from amine treaters, and synthesis gas from coal can all be processed by the method of the present invention.

The reactions of the present invention will proceed at room temperature, 25° C., and can be carried out at a temperature selected over a broad range. The reaction is more rapid at elevated temperatures than at lower temperatures, and for that reason, it is preferably carried out between about 250° and 500° F. (121°–260° C.). In one embodiment of the invention, however, temperature is critical. It has been found that sulfur dioxide can be removed from a gas stream containing sulfur dioxide and a hydrosulfide by contacting the stream with the gaseous basic nitrogen compound at a temperature of above about 500° F. (260° C.). Both sulfur dioxide and the hydrosulfide are removed if the temperature is below 500° F. (260° C.). Therefore, for preferential removal of sulfur dioxide from a gas stream containing sulfur dioxide and a hydrosulfide, it is necessary to carry out the reaction at a temperature of greater than about 500° F. (260° C.).

The amounts or concentrations of sulfur dioxide, gaseous hydrosulfide, sulfur-containing salt and gaseous basic nitrogen compound required to cause the reactions are not critical. Generally, a catalytic amount of the sulfur-containing salt or gaseous basic nitrogen compound will cause the reaction. However, it is often desirable to employ the sulfur-containing salt and/or gaseous basic nitrogen compound in a reactant amount, because the speed of the reaction is increased. About 10 or greater parts per million by volume (ppm) of sulfur dioxide and/or hydrosulfide will normally be present in the gases to be contacted with the sulfur-containing salt and/or gaseous basic nitrogen compound.

Because the chemical reactions involved in the practice of the present invention take place in the vapor phase, the hydrosulfides removed or employed in the present invention are preferably gaseous at reaction temperatures and pressures. Exemplary of suitable hydrosulfides are hydrogen sulfide and its organic derivatives represented by the formula RSH, wherein R is selected from hydrogen and hydrocarbyl, for example alkyl, alkenyl and aryl. Preferably, the hydrosulfides contain fewer than 20 carbon atoms, for reasons of vapor pressure and R is selected from the group consisting of hydrogen, alkyl, alkenyl and aryl, for reasons of availability. More preferably, the hydrosulfide has less than 7 carbon atoms, because such compounds are relatively easy to maintain in the vapor phase. Of these compounds, hydrogen sulfide and/or methyl mercaptan are most preferred, because they are volatile at reaction temperatures and pressures and have been employed with good results.

The sulfur-containing salt which can be usefully employed in accordance with the invention can be any sulfur-containing salt which will catalyze the reaction of sulfur dioxide and/or a gaseous hydrosulfide to form a sulfur-containing composition. Exemplary of suitable salts are those which contain a cation selected from the group consisting of an alkali metal, an alkaline earth metal, a heavy metal, an ammonium ion, an alkyl ammonium ion, and an aryl ammonium ion; and an anion selected from the group consisting of sulfite, thiosulfite, thiosulfate, trithionate, tetrathionate, pentathionate and hexathionate. Of these, ammonium thiosulfate and diethyl ammonium thiosulfate are preferred, because they have been tested with good results. For example, a small amount of powdered, dry ammonium thiosulfate or diethyl ammonium thiosulfate were placed in plastic bottles. The bottles were flushed with a mixture of about one-third atmosphere of sulfur dioxide and about two-thirds atmosphere of hydrogen sulfide (i.e., a molar ratio of $SO_2:H_2S$ of about 1:2), sealed, and shaken. The bottles collapsed within a short time. Additional solid material was observed to have formed inside the bottles. On another occasion, a small amount of ammonium thiosulfate in an $H_2S$ transfer line was observed to cause the formation of a yellow material presumed to contain sulfur. In one embodiment of the invention, the sulfur-containing salt can be formed in situ. For example, when a catalytic amount of a gaseous basic nitrogen compound selected from the group consisting of dimethylamine, N-butylamine and sec-butylamine was contacted with a mixture of one-third atmosphere of sulfur dioxide and two-thirds atmosphere of hydrogen sulfide, a pressure drop occurred when the amines were injected and the pressure decayed at a substantial rate for a short time, but as solid material began to cover the reaction vessel walls another pressure drop occurred and the pressure decayed thereafter at a substantially increased rate. Both the subjective observations and the quantitative measurements of pressure versus time indicate that the solid which had formed was further catalyzing the solid-forming reaction. These solids were characterized as a mixture of sulfur, alkylammonium sulfite and alkylammonium thiosulfates.

In the practice of this invention, it is required that the reaction of the sulfur-containing gas with the basic nitrogen compound be carried out in the gas phase. The basic nitrogen compound should be chosen so that it is in the gas phase under the pressure and temperature conditions under which the reaction is carried out. Exemplary of suitable basic nitrogen compounds are ammonia and its organic derivatives represented by the formula $NR_3$ wherein each R can be the same or different and is individually selected from the group consisting of hydrogen and hydrocarbyl, for example, alkyl, alkenyl and aryl. Thus, ammonia and amines are suitable for use. The amines can be primary, secondary or tertiary. Additionally, heterocyclic amines, for example, pyridine, pyrrole, and piperidine, are also effective in promoting the reaction. Preferably, the basic nitrogen compound has fewer than 24 carbon atoms so that it will exert sufficient vapor pressure at the selected reaction temperature to drive the reaction. Mixtures of suitable amines and/or ammonia can also be used in the practice of the invention.

The preferred gaseous basic nitrogen compounds are those selected from the group consisting of ammonia, methylamine, dimethylamine, trimethylamine, ethylamine, diethylamine, triethylamine, isopropylamine, n-butylamine, sec-butylamine, tert-butylamine and pyridine, because they have been tested and provide good results in the conversion of sulfur dioxide and hydrogen sulfide. Basic nitrogen compounds selected from the group consisting of ammonia, ethylamine, diethylamine and triethylamine are particularly preferred, because they appear to have a high degree of cost effectiveness. Basic nitrogen compounds selected from the group consisting of dimethylamine, N-butylamine and sec-butylamine are also particularly preferred, because they provide a catalytically active sulfur-containing salt when employed to convert a mixture of sulfur dioxide and hydrogen sulfide in tests carried out at temperatures below about 260° C. Diethylamine is also particularly preferred because it provides an extremely rapid conversion of sulfur dioxide and hydrogen sulfide and has been successfully employed to convert a mixture of sulfur dioxide and methyl mercaptan to a sulfur-containing solid composition.

The basic nitrogen compound can be employed in the reaction in either catalytic or reagent quantities. It is desirable to employ the basic nitrogen compound in reagent quantities, because the reaction proceeds at a greater rate. Thus stoichiometrical and complete reaction can be achieved in periods as short as 2 seconds or less. It is believed that the stoichiometric mole ratios for the reaction for reaction times less than about 2 seconds between the basic nitrogen compound, sulfur dioxide and hydrosulfide is about 1.1:1 when the hydrosulfide is hydrogen sulfide and about 2:1:1 when the hydrosulfide is a mercaptan. The amount of basic nitrogen compound utilized in the present invention is thus dependent on whether it is to be employed in a catalytic or reactive amount, which is in turn dependent on the extent of reaction completion desired and the amount of time allowed for reaction and if in a reactive amount, upon the character of the hydrosulfide with which it is to be reacted. The amount of basic nitrogen compound can thus be selected over a very broad range. It is believed that a mole ratio of basic nitrogen compound to combined moles of sulfur dioxide and hydrosulfide in the range of from about 0.001:1 to about 10:1 is suitable, with a ratio in the range of from about 1:5 to about 5:1 being preferred, since it closely encompasses reagent amounts of the basic nitrogen compound and yields a high rate of reaction.

The reaction rate is increased by employing higher amounts of basic nitrogen compound. Thus, where high throughput is desired, it is desirable to add excess (i.e., greater than stoichiometric) amounts of the basic nitrogen compound and recycle the excess.

The gaseous concentrations of sulfur dioxide and/or hydrosulfide to be converted by the process of this invention can range upward from about 1 part per million by volume (ppm). It is believed that the process of the present invention can best be employed when the combined concentrations of sulfur dioxide and/or hydrosulfide is between about 10 and 1,000,000 ppm. When the combined concentrations of sulfur dioxide and/or hydrosulfide are above about 10 ppm, the process of the present invention can be employed to readily reduce their combined concentration down to about 10 ppm.

When practicing the embodiment of the invention wherein it is desired to react both sulfur dioxide and a hydrosulfide in the presence of the sulfur-containing salt and/or the basic nitrogen compound, it is preferable that the mole ratio of sulfur dioxide to hydrosulfide be in the range of from about 1:100 to about 100:1, and more preferably, between about 1:10 and about 10:1 for reasons of stoichiometry. For the most complete removal at short reaction times, the mole ratio between sulfur dioxide and hydrosulfide should be between about 0.7:1 and 1.3:1. It is thus preferable to adjust the mole ratio between sulfur dioxide and hydrosulfide toward stoichiometric 1:1 in a commercial process.

Figure 1:
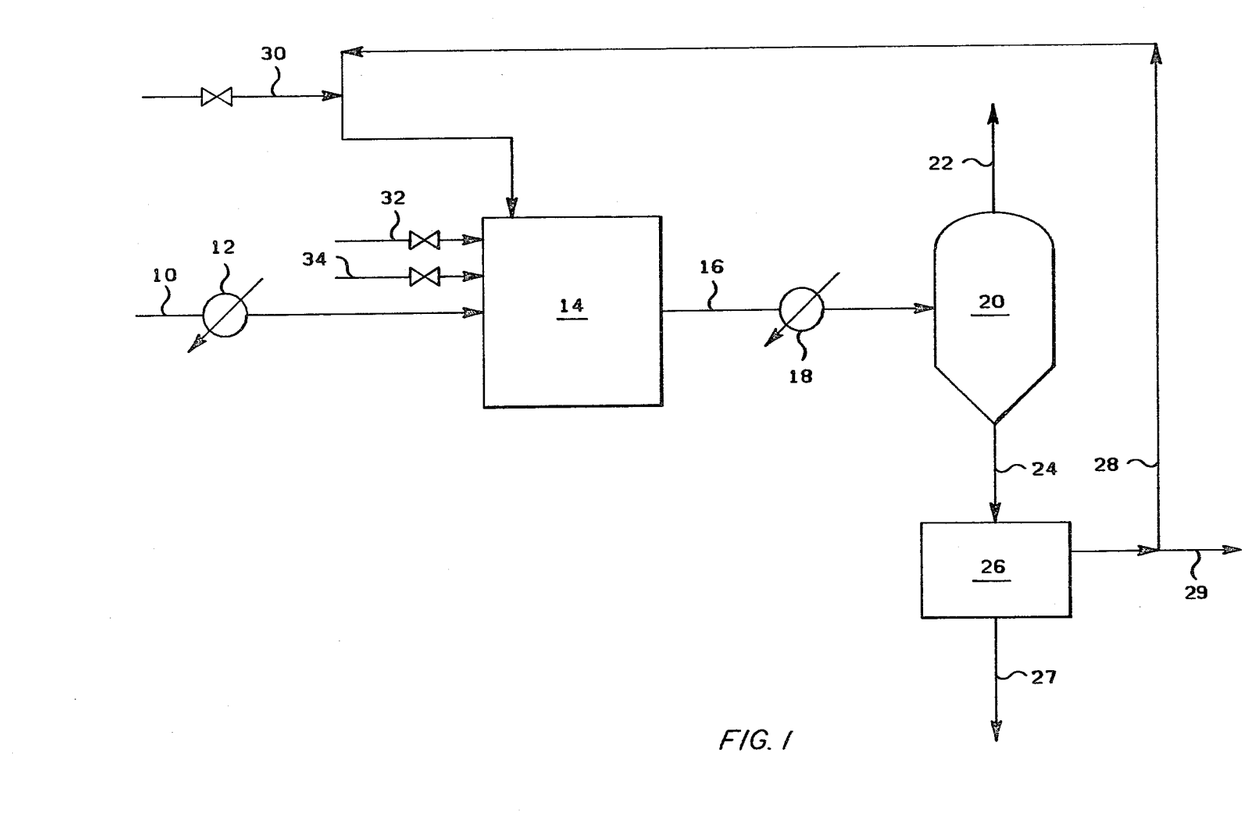
FIG. 1 is a diagrammatic illustration of one embodiment of the method according to the invention.

Referring to FIG. 1, a gas stream comprising at least one of sulfur dioxide, hydrosulfides and basic nitrogen compounds is charged via conduit 10 to mixer-reactor 14, where sulfur-containing solid is formed. The temperature of stream 10 is regulated by heat exchanger 12. The contents of the mixer-reactor 14 are charged via conduit 16 to cooler 18 and then to a vapor-solids separator 20. The treated gas is removed from separator 20 via conduit 22. The solid containing sulfur and nitrogen is removed from separator 20 via conduit 24 and passed to basic nitrogen compound recovery zone 26, wherein the basic nitrogen compounds are recovered. The sulfur-containing solid is removed via conduit 27. The recovered basic nitrogen compound can be recycled to mixer-reactor 14 via conduit 28. Make-up basic nitrogen compound can be added via conduit 30 if desired. Alternatively, the nitrogenous material can be withdrawn from the cyclic process via conduit 29. Make-up hydrosulfides are added to mixer-reactor 14 via conduit 32, and make-up sulfur dioxide is added via conduit 34.

The pressure in mixer-reactor 14 is not critical, although higher pressures will favor the reaction to form the solid. If desired, optional compressors (not shown) can be suitably placed in conduits 10, 28, 32 and 34 to increase the pressure in mixer-reactor 14 and lock-hoppers provided in lines 24 and/or 27 for removal of solids in order to increase the reaction rate.

The time in which the reaction is allowed to proceed may vary broadly but will generally be from about one second to about one hour, depending for example upon reactor temperature and pressure, and the concentrations of basic nitrogen compounds and sulfur-containing gases and the extent of reaction completion desired.

Reactor 14 can be any vessel in which turbulent mixing can occur, for example, a Venturi mixer. Alternatively, it can be a transfer line with optional static mixers. The reaction of $SO_2$ and hydrosulfide and basic nitrogen compound can be conducted either as a batch reaction or as a substantially continuous reaction. Mixer-reactor 14 should be of sufficient size in order to attain the desired reaction (or residence) time for the quantity of gases being charged thereto.

After the gases have reacted to the desired extent, the products of the reaction can all be sent to cooler 18 before the solids are separated from the gases; or alternatively, the vapor-solids separator 20 can have an associated cooling means (not shown); or alternatively, if desired, cooler 18 may be a direct quench step. If desired, the products in the vapor-solid separator 20 can be cooled to a temperature below the boiling point of the basic nitrogen compound and any excess basic nitrogen compound can be condensed and removed from the treated gas and sent with the sulfur-containing solids to basic nitrogen compound recovery zone 26. However, if no cooling in vapor-solid separator 20 is desired, the basic nitrogen compound will be in the vapor state or will be complexed or adsorbed onto the solids.

The treated gas can be released to the atmosphere via conduit 22. It will generally contain some minor amount of unreacted contaminant hydrosulfide and basic nitrogen compound. However, these will generally each be less than about 20 parts per million when the gas is being treated for disposal to the atmosphere or when these low levels are needed for other reasons.

The solids which have formed are sent to basic nitrogen compound recovery zone 26. In this zone, any suitable amine and/or ammonia recovery step for recovering the nitrogenous material from the solids can be used. For example, the nitrogenous material can be recovered at least in part by washing the solids with water and then distilling the amine (and/or ammonia) from the wash water. The vapor pressure of the basic nitrogen compound can be increased by increasing the pH of the wash water. Thus washing with solutions containing alkali metal or alkaline earth hydroxides and then distilling off the amines and/or ammonia is preferred. In those cases where amines alone are employed it is possible to recover the amine from the solid product by treatment with liquid or gaseous anhydrous ammonia. The amines can then be distilled from the ammonia. The recovery of amines by reaction with ammonia is preferred for basic nitrogen compound recovery from carbon black because the carbon black is not wet by water in the process and the excess ammonia is readily distilled from the carbon black. An alternative for carbon black smoke desulfurization is to simply leave the amine in the carbon black since doing so can in certain cases impart unexpected and desirable properties to the black. If desired, steam stripping can also be used to aid in the removal of the basic nitrogen compound which can be recycled.

Recycled basic nitrogen compound can be sent via conduit 28 back to mixer-reactor 14. If desired, make-up basic nitrogen compound can be introduced via conduit 30, depending upon the amount thereof which is needed to react with the incoming gas. A valve in conduit 30 is opened when make-up basic nitrogen compound is added; and otherwise, it is closed. The make-up nitrogen compound is used to augment the recycle in conduit 28, if needed. However, if amine and/or ammonia are contaminants which are being removed and are present in sufficiently high amounts, such recycling will generally not be employed. Instead, amine and/or ammonia will be removed via conduit 29.

Likewise, depending upon the components of the incoming gas, make-up hydrosulfide can be added to mixer-reactor 14 via conduit 32 through a valve which is open when such addition is desired; and otherwise, that valve is closed. Also, make-up sulfur dioxide can be added via conduit 34 and the valve in that path is open when such addition is added; and otherwise, it is closed. In view of the chemical reactions previously discussed, it may be, of course, desirable to add at least one of sulfur dioxide and hydrosulfide to the incoming gas to adjust the sulfur dioxide:hydrosulfide mole ratio closer to 1:1, preferably to within the range of 0.2:1 to 5:1, more preferably to within the range of from about 0.7:1 to about 1.3:1.

The sulfur-containing solid which is removed from basic nitrogen compound recovery zone 26 will be preferably substantially free from nitrogenous material, particularly amine compounds and amines. The sulfur-containing solid which is removed via conduit 27 can be used, if desired, in further reactions. The sulfur-containing solid material removed via conduit 27 will probably comprise elemental sulfur, thiosulfates, sulfites and perhaps fly ash. This material can readily be separated into an elemental sulfur-rich portion and an elemental sulfur-lean portion by phase separation after it has been subjected to sufficient heat to melt the elemental sulfur. The benefits from the phase separation include a reduction in the amount of sulfur-containing material which must be disposed of and the production of relatively pure elemental sulfur, a valuable product.

Additionally, it has been found that the nitrogen- and sulfur-containing solid catalyzes the reaction in mixer-reactor 14. Therefore, if desired, a portion of the solid can be recycled back to zone 14. If this recycling is employed, it is believed that little or no further make-up basic nitrogen compound will be needed for the reaction to continue indefinitely.

In the embodiment of the present invention wherein amine and/or ammonia are removed from an incoming gas stream, which may or may not also contain sulfur dioxide and/or a hydrosulfide, the recovered amine and/or ammonia could, of course, be used as desired.

When the incoming gas stream is carbon black smoke containing gaseous sulfur dioxide and/or a hydrosulfide such as hydrogen sulfide, the solid which is passed via conduit 24 into recovery zone 26 will contain both solid carbon black and the solid sulfur-containing reaction product. In recovery zone 26, the basic nitrogen compound is recovered from the solids by any suitable recovery method, for example, by washing the solids with water and then distilling the wash water. It is preferable, however, to drive off the basic nitrogen compound with anhydrous ammonia so as to avoid wetting the carbon black. Carbon black mixed with the sulfur-containing solid is used directly in certain carbon black manufacturing processes, for example, in the manufacture of tires. In such manufacture, it is desirable that the carbon black contain sulfur.

Figure 3:
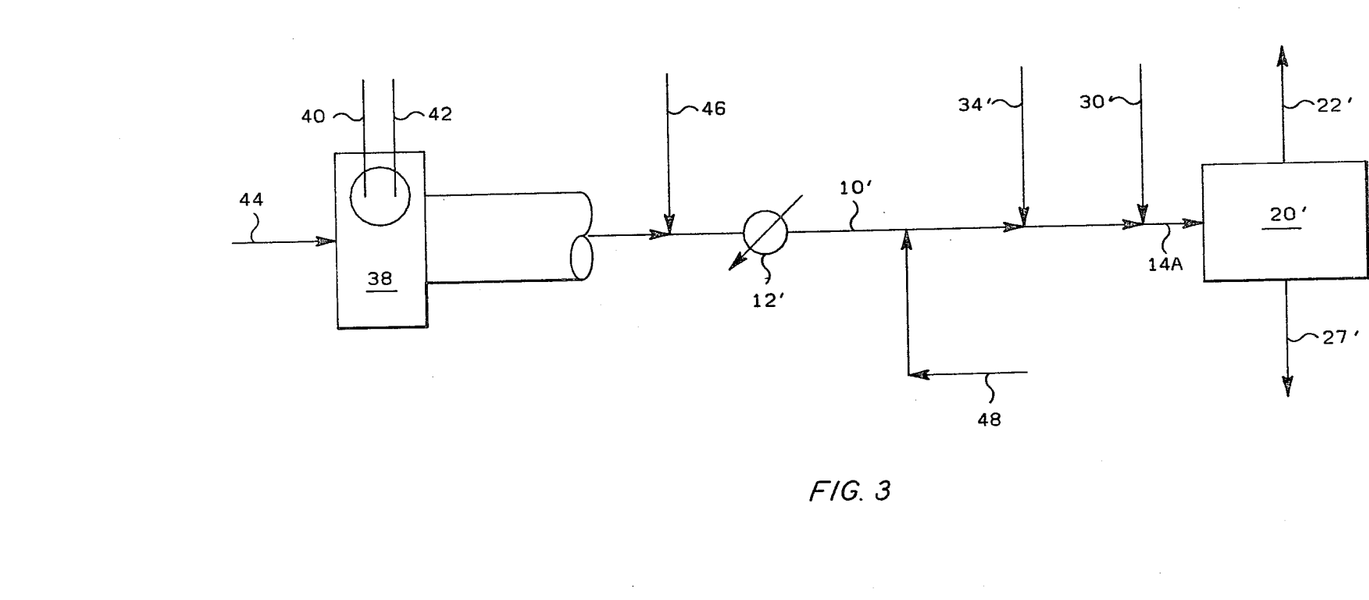
FIG. 3 is a schematic flow diagram illustrating a typical operation of an embodiment according to the invention wherein a carbon black reactor effluent is treated by the method of the invention. The numbered items in FIG. 3 correspond to the numbered materials in Table IV.

Referring to FIG. 3, air is introduced tangentially through conduit 40 into carbon black reactor 38; fuel is introduced tangentially through conduit 42 and combusted with at least a portion of the air introduced via conduit 40; and make-oil is introduced through conduit 44. The make-oil pyrolyzes to form carbon black smoke, which is quenched at 46, for example, with water which is sprayed into the conduit containing the smoke. The smoke can be further cooled in heat exchanger means 12'.

A multiplicity of other carbon black reactors (not shown) can also feed the system, the output from the other reactors being introduced through conduit 48. The remaining parts of the system shown in FIG. 3 correspond to the parts in FIG. 1 (discussed above), except that in the embodiment illustrated in FIG. 3 the transfer line 14A from the point of introduction of conduit 30' to separator 20' is serving as the mixer-reactor 14. Separator 20' can be a conventional bag house. The sulfur-containing solid is removed from separator 20' via conduit 27'. Conduit 22' is used to remove off-gas (mostly $N_2$, CO, $CO_2$ and $H_2O$) from separator 20'.

Although it is known that carbon black smoke can contain minor amounts of both $H_2S$ and $SO_2$ and although it is known to add $NH_3$ to carbon black smoke for the purpose of adjusting the pH therein, it has not been known that it is desirable to add $H_2S$ or $SO_2$ or both to a gas mixture containing $H_2S$ or $SO_2$ or both in order better to remove the sulfurous contaminants.

Another embodiment in the above-described invention is especially useful for the situation wherein low concentrations of $SO_2$ and hydrosulfide are both present in the incoming gas stream and no carbon black is present. Instead of adding amine to the sulfurous gases (via conduit 30), one may wish instead to place a sulfur-containing salt, for example, powdered diethyl ammonium thiosulfate or ammonium thiosulfate in mixer-reactor 14 and pass the gas mixture through the solid. Other dry solids which are expected to give good results are the alkali, alkaline earth, heavy metal, ammonium, alkyl ammonium, and aryl ammonium salts of the following anions: sulfite, thiosulfite, thiosulfate, and tri-, tetra-, penta- and hexa- thionates. In this invention, the term heavy metal means a metal having an atomic number within the range from 20-34, within the range from 38-52, or within the range from 56-74. In this embodiment the sulfur-containing solid is preferably used in excess of stoichiometric, and reactor 14 may be a fluidized bed. It is believed that this embodiment is effective to remove mercaptans from the gas streams as well as $H_2S$. Also, in this embodiment, there would be no vapor-solids separator 20 and no amine and/or ammonia located downstream from mixer-reactor 14. Instead, the ammonium thiosulfate or other suitable solid is periodically regenerated, for example, by heating it in air or by contacting it with ammonia and then with steam.

Figure 4:
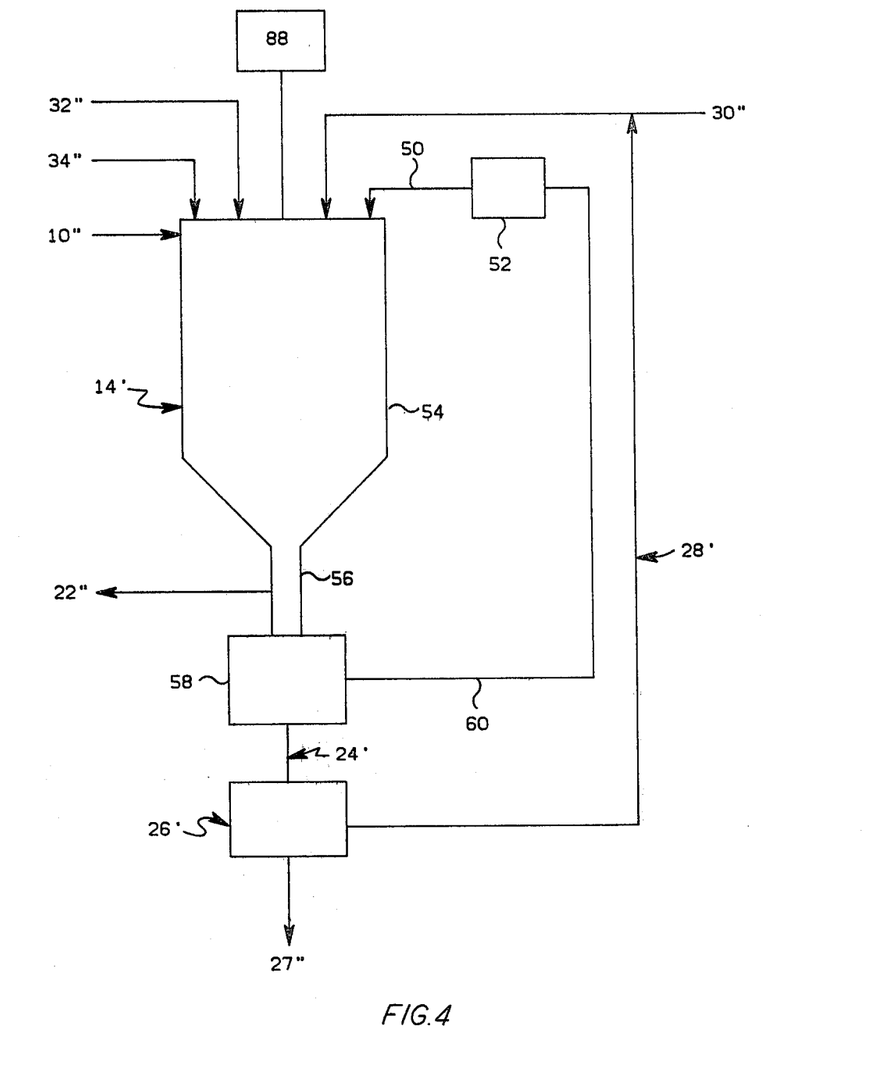
FIG. 4 is a schematic of a preferred embodiment of the invention.
Figure 5:
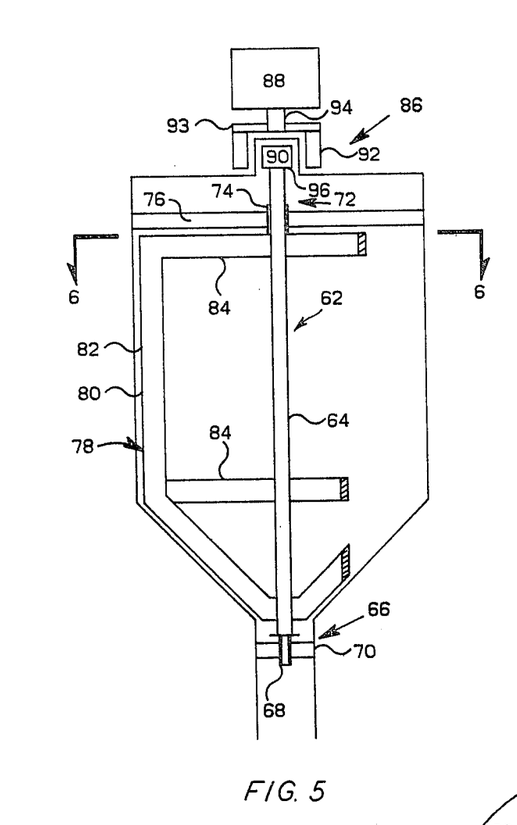
FIG. 5 is a cross-sectional view of a preferred reaction vessel.
Figure 6:
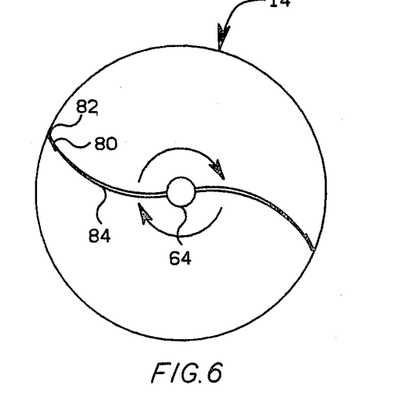
FIG. 6 is a plan view of the interior of the reaction vessel taken along the line indicated in FIG. 5.

FIGS. 4–6 illustrate a preferred apparatus for carrying out the process of the present invention to purify off-gases, for example stack gases. A gas stream comprising at least one of sulfur dioxide, a hydrosulfide, and a basic nitrogen compound is charged via conduit 10" to mixer reactor 14', wherein sulfur-containing solid is formed. Sulfur dioxide can be introduced into mixer-reactor 14' via conduit 34". Hydrosulfide can be introduced into mixer reactor 14' via conduit 32". Basic nitrogen compounds can be introduced into mixer reactor 14' via conduit 30". Catalytic sulfur-containing salt can be introduced into mixer reactor 14' via conduit 50. A lock-hopper 52 is in cooperation with conduit 50 so that higher than atmospheric pressures can be utilized in mixer reactor 14'. When employing sulfur-containing salt as catalyst, it is desirable to incline the axis of mixer-reactor 14' toward the horizontal, to increase the residence time of the sulfur-containing salt.

The sulfur-containing solid which is formed in mixer-reactor 14' migrates down sloping walls 54 of mixer-reactor 14' and through conduit 56 to lock-hopper 58. The treated gas is separated from the sulfur-containing salt in conduit 56 and removed via conduit 22". A portion of sulfur-containing salt can be recycled, if desired, via conduit 60 to lock-hopper 52. Sulfur-containing salt can also be charged via conduit 24' to basic nitrogen compound recovery zone 26', and there treated to release basic nitrogen compound from the sulfur-containing solid. The basic nitrogen compound can be recycled via conduit 28' to conduit 30". The sulfur-containing salt is removed from recovery zone 26' via conduit 27".

Mixer-reactor 14' has supported therein an impeller means designated generally as 62. The impeller means 62 comprises a central shaft 64 longitudinally disposed in the mixer-reactor 14'. Shaft 64 is supported adjacent its lower end by support means 66, which can be a bushing 68 or the like mounted via a suitable support member 70 to the lower portion of mixer-reactor 14', or, as shown, in conduit 56. The upper end of shaft 64 is rotatably mounted in a mounting means 72, which, as shown, comprises a bushing 74 affixed to at least one support member 76 mounted to the interior surface of an upper portion of mixer-reactor 14'. Affixed to shaft 64 is at least one scraping means 78, which, as shown, comprises a blade 80 having a scraping edge 82 positioned closely to the interior surface of mixer-reactor 14'. Support means 84 establish cooperation between blade 80 and shaft 64. Preferably, the support means 84 are arcuate in shape and operate to bias the scraping edge 82 of the blade 80 against the interior surface of mixer-reactor 14'. More preferably, support means 84 comprise acruate leaf springs affixed at one end to shaft 64 and at the other end to blade 80 to orient blade 80 at an acute angle with respect to the interior surface of mixer-reactor 14'. In this embodiment, blades 80 closely scrape the sulfur-containing solid from the walls of reactor-mixer 14', and should seize-up of the impeller occur, its direction of rotation can be easily reversed and re-reversed until smooth operation resumes.

Magnetic coupling means 86 establish cooperation between shaft 64 and a motor means 88. The coupling means 86 comprises a magnetic disc 90 affixed by its center to the upper end of the shaft 64. Disc 90 has magnetics constructed of, for example, barium ferrite along its cylindrical surface. A magnetic cylinder 92 having magnets along its interior cylindrical surface and at least partially bridged by a top cylinder closure 93 is attached by the center of top cylinder closure 93 to a shaft 94 off motor means 88. A window 96 is affixed to the upper portion of mixer-reactor 14' between magnetic disc 90 and magnetic cylinder 92. The window is constructed of a material transparent to magnetism, for example, a ceramic material.

EXAMPLES

The following examples illustrate the scope and utility of the invention. Examples I, II and III were carried out. Example IV is a calculated embodiment.

EXAMPLE I

A series of batch experiments was made, using a one-liter flask and operating at room temperature. About one-third atmosphere of sulfur dioxide ($SO_2$) and two-thirds atmosphere of hydrogen sulfide ($H_2S$) were blended. The pressure of the vessel was continuously monitored. Various materials were candidates for catalytic reagents in the reaction period. One candidate was injected in each run via a septum to provide approximately $1.4 \times 10^{-2}$ moles of vapor phase catalyst per mole of $SO_2$ for each experiment. The experiment was generally run until the reaction vessel pressure had dropped to about 100–200 torr, or until run duration had exceeded one hour (generally 2 hours or more). The logarithm of pressure (log P) in torr was plotted versus time (in minutes); and the slopes of the best-fit straight lines for the data points were calculated for the earlier part of the experiments. The results for the various catalytic reagents are shown in Table I.

TABLE I

| Catalyst Injected | First Slope $\times 10^2$ Min$^{-1}$ | Approximate Reaction Time, Min | Final Pressure**, Torr | Second Slope $\times 10^2$ Min$^{-1}$ | Approximate Reaction Time*, Min | Final Pressure** Torr |
|---|---|---|---|---|---|---|
| Water | 0.246 | 60 | 600 | | | |
| Ammonia | 0.31 | 280 | 100 | | | |
| Methylamine | 0.438 | 150 | 150 | | | |
| Dimethylamine | 0.667 | 10 | 620 | 4.87 | 12 | 165 |
| Trimethylamine | 0.348 | 170 | 200 | | | |
| Ethylamine | 3.62 | 18 | 130 | | | |
| Diethylamine | 2.52 | 20 | 150 | | | |
| Triethylamine | 2.25 | 30 | 140 | | | |
| Triethylamine-$SO_2$ | 0.314 | 140 | 260 | | | |
| Isopropylamine | 0.353 | 140 | 240 | | | |
| N-butylamine | 0.457 | 20 | 600 | 6.96 | 10 | 120 |
| Sec-butylamine | 0.351 | 80 | 370 | 2.00 | 15 | 190 |
| Tert-butylamine | 0.170 | 90 | 530 | | | |
| Pyridine | 0.280 | 130 | 300 | | | |

TABLE I-continued

| Catalyst Injected | First Slope $\times 10^2$ Min$^{-1}$ | Approximate Reaction Time, Min | Final Pressure**, Torr | Second Slope $\times 10^2$ Min$^{-1}$ | Approximate Reaction Time*, Min | Final Pressure** Torr |
|---|---|---|---|---|---|---|
| None | 0.144 | | | | | |

*Time for the secondary reaction only.
**Final pressure at the time the slope changed dramatically or the experiment was discontinued, not to be construed as an equilibrium or asymptotic pressure.

Figure 2:
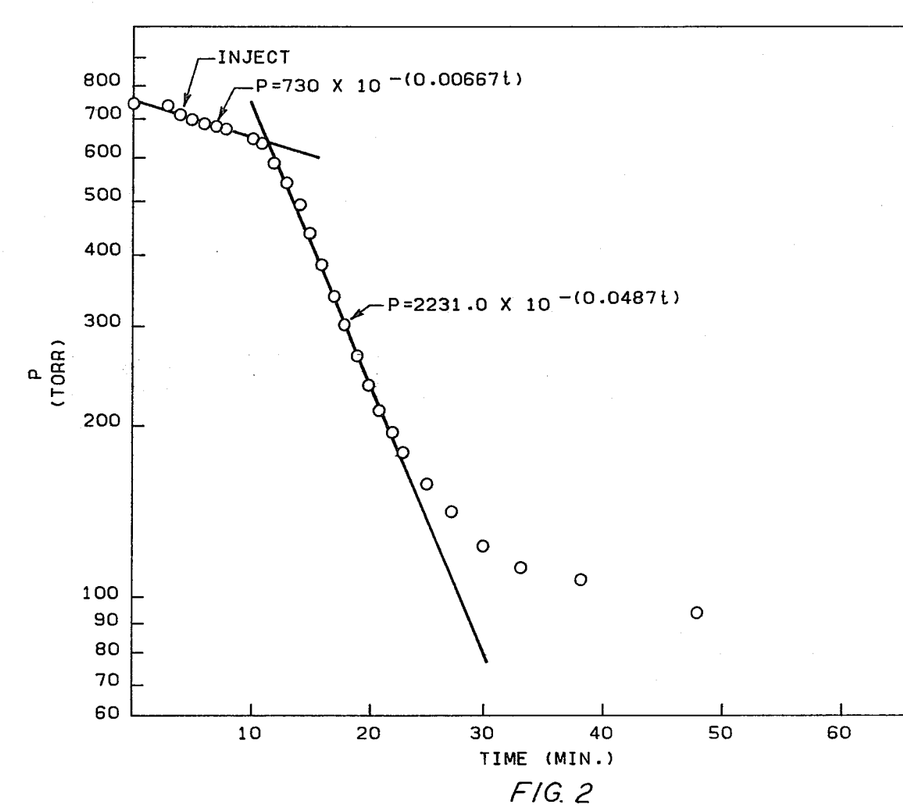
FIG. 2 shows a typical graph of pressure versus time which was made for the injection of dimethylamine vapor into a reaction vessel containing $SO_2$ and $H_2S$, as discussed below in Example I.

A comparison of the slopes in Table I provides a qualitative comparison of the relative effectiveness of the reagents under the conditions tested. The data gathered for three particular amines (dimethylamine, n-butylamine, and sec-butylamine) show that a second and steeper slope was observed after the experiment had been in progress for several minutes. Please refer to FIG. 2, which shows the graph for dimethylamine, illustrating this second slope for the injection of 5 cc. of dimethylamine vapor, one atmosphere, 70° F., into a one liter reaction vessel containing 242 torr $SO_2$ and 486 torr $H_2S$. The decrease in pressure occurred as the reaction progressed and as the solid formed. This second slope indicates that a reaction product is serving as a catalyst even more effectively than these three above-listed parent amines.

The results of these experiments indicate that some reaction occurs without catalyst, that the reaction is slightly enhanced by water, that ammonia had only a slight catalytic effect under the conditions of the test, that the best amines tested include mono-, di-, and tri-ethylamine, and that reaction rates of dimethylamine, n-butylamine, and sec-butylamine were greatly enhanced after an intermediate formed in sufficient quantities to influence the reaction.

EXAMPLE II

This example demonstrates the operability of the present invention to remove at least one of $SO_2$, a hydrosulfide, and a basic nitrogen compound from a gas stream containing the at least one contaminant in a continuous process. In the following gaseous phase tests, hydrogen sulfide and sulfur dioxide were separately diluted with nitrogen to the desired concentration level, and an additional nitrogen stream was fed through a diethylamine (DEA) saturator to provide the desired amount of DEA to be tested. The $H_2S$ and the DEA-containing gas stream were thoroughly mixed but did not react. This combined stream and the $SO_2$-containing stream were preheated and fed into one end of a 1-inch diameter $\times$ 30 inch stainless steel reactor tube which was maintained at the desired temperature by an electric heater, the streams impinging on each other in such a manner that good mixing was obtained. Residence time in the reactor was approximately two seconds. The effluent was sampled and analyzed by gas chromatography. DEA concentration in the feed stream was increased until nearly all sulfurous gases had been removed. In each test DEA concentration was increased until either $H_2S$ or $SO_2$ or both were <20 ppm in the effluent at the reactor conditions for that test. The results are displayed in Table II.

TABLE II

| Test No. | Feed Composition, PPM (V) | | | Reactor Temp. °F. | Effluent Composition, PPM (V) | | |
|---|---|---|---|---|---|---|---|
| | $H_2S$ | $SO_2$ | DEA | | $H_2S$ | $SO_2$ | DEA |
| 1 | 310 | 300 | 180* | 240 | 250 | 67 | 0 |
| | 310 | 300 | 240* | 240 | <20 | 25 | 0 |
| 2 | 309 | 326 | 150 | 360 | 295 | 175 | 0 |
| | 309 | 326 | 220 | 360 | <20 | 48 | 0 |
| | 309 | 326 | 290 | 360 | <20 | <20 | 0 |
| 3 | 998 | 998 | 400 | 418 | 400 | <20 | 0 |
| | 998 | 998 | 1000 | 418 | <20 | <20 | 0 |
| 4 | 998 | 998 | 1350 | 503 | ~1000 | 150 | 0 |
| | 998 | 998 | 1550 | 503 | 850 | <20 | 0 |

*Feed additionally contained 3 mol percent water vapor.

The results of Table II demonstrate the removal of $H_2S$ and $SO_2$, DEA having been added. Test number one demonstrates that the presence of water vapor does not materially affect the reaction. The other tests were carried out in the absence of water, and no water was detected in the effluent. Note that for #4 @ 503° F. only $SO_2$ was significantly reduced.

EXAMPLE III

A process as described in Example II was carried out, except that methylmercaptan was substituted for $H_2S$. The results are displayed in Table III.

TABLE III

| Test No. | Feed Composition, PPM (V) | | | Reactor Temp. °F. | Effluent Composition, PPM (V) | | |
|---|---|---|---|---|---|---|---|
| | $CH_3SH$ | $SO_2$ | DEA | | $CH_3SH$ | $SO_2$ | DEA |
| 1 | 920 | 1000 | 0 | 402 | 920 | 1000 | 0 |
| 2 | 920 | 1000 | 1410 | 402 | 240 | 70 | 0 |
| 3 | 920 | 1000 | 1910 | 402 | 60 | 40 | 0 |

The results shown in Table III show the operability of DEA to remove $CH_3SH$ and/or $SO_2$ from a gas stream containing these materials by adding vaporous DEA to the stream. The runs were carried out in the absence of water and no water was detected in the reactor effluent. At low DEA concentration $SO_2$ is preferentially removed, but at a $CH_3SH:SO_2:DEA$ mole ratio of about 1:1:2 both $CH_3SH$ and $SO_2$ are almost completely removed. The bright yellow, solid product formed by the reaction was water-insoluble and believed to contain elemental sulfur.

EXAMPLE IV (Calculated Embodiment)

An illustrated, calculated embodiment is given in Table I, illustrating a typical operation of a carbon black reactor with the carbon black effluent (smoke) being treated in accordance with the invention to yield a low $H_2S$ and $SO_2$ content filter off-gas and with the sulfur compounds being recovered on the carbon black product. In the calculated embodiment, $SO_2$ was added to bring the $SO_2:H_2S$ mole ratio to about 1:1, which (as described above) is within the preferred range for reaction times of about 2 seconds. The amine which was added was diethylamine (DEA); and it was added in an amount so that the mole ratio of the amine to $H_2S$ was also within the range from about 0.7:1 to 1.3:1. The reaction temperature in the calculated embodiment was assumed to be between about 400° F. and 500° F. A suitable carbon black reactor is that described in U.S. Pat. No. 2,564,700.

TABLE IV

Typical Operation
(Estimated)
See FIG. 3

| | |
|---|---|
| (10') Carbon Black Quenched Smoke (dry gas analysis): | |
| Quantity, SCF/Hr., (dry) | 2,000,000 |
| Composition, Vol. %,[a] | |
| $SO_2$,[b] | 1,000 ppm (vol.) |
| $H_2S$,[b] | 2,400 ppm (vol.) |
| CO | 14.0 |
| $CO_2$ | 5.5 |
| $H_2$ | 12.5 |
| $N_2$ | (about) 67 |
| Hydrocarbons | (about) 1.0 |
| Carbon Black (solid) | 5.5 pounds/1000 SCF |
| (34') Added $SO_2$ (gas): | |
| Quantity, SCF/Hr., | 2800 |
| (to attain $SO_2$ to $H_2S$ at 1:1 mol ratio) | |
| (30') Diethylamine (DEA) Injection: | |
| Quantity, Pound Mols/Hour | 13.4 |
| Mol Ratio DEA/$H_2S$ | 1.06 |
| Mol Ratio DEA/($H_2S$ + $SO_2$) | 0.53 |
| (22') Filtered Off-Gas (dry gas analysis): | |
| Quantity, SCF/Hr., (dry) | 2,000,000 |
| Composition, Vol. %[c] | |
| $SO_2$ | 20 ppm (vol.) |
| $H_2S$ | 20 ppm (vol.) |
| CO | 14.0 |
| $CO_2$ | 5.5 |
| $H_2$ | 12.5 |
| $N_2$ | (about) 67 |
| Hydrocarbons | (about) 1 |
| (27') Carbon Black Product: | |
| Quantity, Pounds/Hr., | 11,000 |
| Wt. % Sulfur,[d] | (about) 6.9 |
| Amine-$H_2S$—$SO_2$ Reaction Conditions: | |
| Temperature, °F., | 500 |
| Reaction pressure, psig, | 2 |
| Contacting time, seconds, | 2 |
| Filtering temperature, °F., | 500 |
| Carbon Black Reactor (each):[e] | |
| Tangential Air[40], SCF/Hr., | 187,500 |
| Tangential Fuel[42], SCF/Hr., | 12,500 |
| Air-to-Fuel Volume Ratio | 15:1 |
| Make-oil[44], Gallons/Hour, | 260 |
| BMCI[g], 120 | |
| Mid-Boiling Point, °F., 700 | |
| Sulfur, Wt. %, 2.6 | |
| Air/Oil, SCF/Gal. | 720 |
| Quench Water[46], Gal/Hr., | 900 |
| Carbon Black (27'), Pounds/Hr., | |
| (N339),[h] | 1100 |
| Wt. %, S,[i] | 6.9 |

[a] except as noted;
[b] based on 2.6 wt. % sulfur in feed oil.
[c] except as noted.
[d] as sulfur and amine compounds, measured as sulfur.
[e] 10 reactors feed line to filter;
[f] Methane as fuel
[g] Bureau of Mines Correlation Index
[h] ASTM D-1765-76
[i] Solids containing nitrogen and sulfur The numbers in Table III identifying materials correspond to the places in FIG. 3 where these materials are found. FIG. 3 is numbered to correspond wherever possible to the numbering in FIG. 1.

The calculated embodiment demonstrates the reduction of the concentration of $SO_2$ and $H_2S$ in carbon black reactor effluent, with the sulfur compound being recovered on the carbon black product.

Although the invention has been described in detail for purposes of explanation and illustration, it is not intended to be limited thereby. Rather, reasonable modifications and additions which would be apparent to one with ordinary skill in the art are included within the scope of this invention.

That which is claimed is:

1. A process comprising contacting at least one gas selected from the group consisting of sulfur dioxide and hydrogen sulfide with a dry sulfur-containing salt having a cationic portion selected from the group consisting of an alkali metal, an alkaline earth metal, a heavy metal, ammonium, alkyl ammonium and aryl ammonium, and an anionic portion selected from the group consisting of thiosulfite, thiosulfate, trithionate, tetrathionate, pentathionate and hexathionate to form a solid sulfur-containing composition.

2. A process as in claim 1 wherein said dry sulfur-containing salt has a cationic portion selected from the group consisting of ammonium, alkyl ammonium and aryl ammonium, and an anionic portion selected from the group consisting of thiosulfite and thiosulfate.

3. A process as in claim 1 wherein said dry sulfur-containing salt is selected from the group consisting of ammonium thiosulfate and diethyl ammonium thiosulfate.

4. A process as in claim 1 wherein said dry sulfur-containing salt is contained in the reaction product between $SO_2$ and $H_2S$ at a mole ratio of about 1:2 at a temperature of less than 260° C. in the presence of a catalytic amount of a basic nitrogen compound selected from the group consisting of dimethylamine, n-butylamine, and sec-butylamine.

5. The process of claim 1 wherein sulfur dioxide is contacted with the dry sulfur-containing salt.

6. The process of claim 1 wherein sulfur dioxide is contacted with a dry sulfur-containing salt having a cationic portion selected from the group consisting of ammonium, alkyl ammonium and aryl ammonium and an anionic portion selected from the group consisting of thiosulfite and thiosulfate.

7. The process of claim 1 wherein hydrogen sulfide is contacted with the dry sulfur-containing salt.

8. The process of claim 1 wherein a dry sulfur-containing salt having a cationic portion selected from the group consisting of ammonium, alkyl ammonium and aryl ammonium and an anionic portion selected from the group consisting of thiosulfite and thiosulfate.

9. The process of claim 1 wherein both sulfur dioxide and hydrogen sulfide are contacted with the dry sulfur-containing salt.

10. The process of claim 1 wherein both sulfur dioxide and hydrogen sulfide are contacted with a dry sulfur-containing salt having a cationic portion selected from the group consisting of ammonium, alkyl ammonium and aryl ammonium and an anionic portion selected from the group consisting of thiosulfite and thiosulfate.

11. The process of claim 1 wherein both sulfur dioxide and hydrogen sulfide are contacted with a dry salt selected from the group consisting of ammonium thiosulfate and diethyl ammonium thiosulfate.

12. The process of claim 1 wherein both sulfur dioxide and hydrogen sulfide are contacted with a dry sulfurcontaining salt contained in the reaction product between $SO_2$ and $H_2S$ at a mole ratio of about 1:2 at a temperature of less than 260° C. in the presence of a catalytic amount of a basic nitrogen compound selected from the group consisting of dimethylamine, n-butylamine, and sec-butylamine.

13. A process as in claim 1 wherein said contacting occurs at above the dew point of water.

14. A process as in claim 1 wherein said contacting occurs at a temperature of between about 25° and 260° C.

15. A process as in claim 1 wherein said contacting occurs at a temperature of between about 120° and about 260° C.

16. A process as in claim 10 wherein both the sulfur dioxide and the hydrogen sulfide are contacted with the dry sulfur-containing salt and wherein the mole ratio between the sulfur dioxide and the hydrosulfide is in the range of from about 0.2:1 to about 5:1.

17. A process as in claim 16 wherein the mole ratio is between about 0.7:1 and about 1.3:1.

18. A process comprising contacting gaseous sulfur dioxide and a gaseous hydrogen sulfide which comprises a mercaptan having less than about 7 carbon atoms with a gaseous basic nitrogen compound to form a solid, sulfur-containing composition.

19. A process as in claim 18 wherein said hydrosulfide is methyl mercaptan.

20. A process as in claim 18 wherein said gaseous basic nitrogen compound is represented by the formula $NR_3$ wherein each R can be the same or different and is independently selected from the group consisting of hydrogen and hydrocarbyl.

21. A process as in claim 18 wherein said basic nitrogen compound is an amine having less than about 7 carbon atoms.

22. A process as in claim 18 wherein said gaseous basic nitrogen compound is selected from the group consisting of ammonia, methylamine, dimethylamine, trimethylamine, ethylamine, diethylamine, triethylamine, isopropylamine, n-butylamine, sec-butylamine, tert-butylamine and pyridine.

23. A process as in claim 18 wherein said gaseous basic nitrogen compound is selected from the group consisting of ammonia, ethylamine, diethylamine and triethylamine.

24. A process as in claim 18 wherein said gaseous basic nitrogen compound is selected from the group consisting of dimethylamine, n-butylamine and sec-butylamine.

25. A process as in claim 18 wherein said gaseous basic nitrogen compound comprises diethylamine.

26. The process of claim 18 wherein the hydrosulfide comprises methyl mercaptan and the basic nitrogen compound comprises diethylamine.

27. A process as in claim 18 wherein said contacting occurs at a temperature above the dew point of water.

28. A process as in claim 18 wherein said contacting occurs at a temperature of between about 25° and 260° C.

29. A process as in claim 18 wherein said contacting occurs at a temperature of between about 120° and about 260° C.

30. A process as in claim 18 wherein said contacting occurs at a temperature of above about 260° C.

31. A process as in claim 18 wherein the mole ratio between the sulfur dioxide and the hydrosulfide is in the range of from about 0.2:1 to about 5:1.

32. A process as in claim 31 wherein the mole ratio between the sulfur dioxide and the mercaptan is between about 0.7:1 and about 1.3:1.

33. A process comprising:
  (a) providing a first gas stream containing at least one of a first concentration of sulfur dioxide and a second concentration of a hydrosulfide;
  (b) determining the first concentration of sulfur dioxide and the second concentration of hydrosulfide in said first gas stream;
  (c) adjusting at least one of the first concentration and the second concentration so that the first gas stream contains both sulfur dioxide and hydrosulfide in a mole ratio between about 0.7:1 and about 1.3:1 to form a second gas stream; and
  (d) contacting said second gas stream with at least one material selected from the group consisting of a dry sulfur containing salt and a gaseous basic nitrogen compound to produce a third gas stream and a sulfur-containing composition.

34. A process as in claim 33 wherein said contacting occurs above the dew point of water.

35. A process as in claim 33 wherein said contacting occurs at a temperature of between about 25° C. and about 260° C.

36. A process as in claim 34 wherein said contacting occurs at a temperature of between about 120° C. and about 260° C.

37. A process as in claim 35 wherein said hydrosulfide is represented by the formula RSH, wherein R is selected from the group consisting of hydrogen and a hydrocarbly having fewer than about 20 carbon atoms; wherein said dry sulfur-containing salt has a cationic portion selected from the group consisting of an alkali metal, an alkaline earth metal, a heavy metal, ammonium, alkylammonium and arylammonium and an ionic portion selected from the group consisting of sulfite, thiosulfite, thiosulfate, trithionate, tetrathionate, pentathionate and hexathionate; and wherein said basic nitrogen compound is selected from the group consisting of ammonia and an amine having fewer than about 20 carbon atoms.

38. A process as in claim 37 wherein said hydrosulfide is hydrogen sulfide, wherein said basic nitrogen compound is selected from the group consisitng of dimethylamine, N-butylamine and sec-butylamine and wherein said dry sulfur-containing salt is contained in the reaction product of sulfur dioxide and hydrogen sulfide in the presence of a catalytic amount of a basic nitrogen compound selected from the group consisting of dimethylamine, N-butylamine and sec-butylamine at a temperature of less than 260° C.

39. A process as in claim 37 wherein said basic nitrogen compound is selected from the group consisting of ammonia, ethylamine, diethylamine and triethylamine.

40. A process as in claim 39 further comprising treating said sulfur-containing solid to produce a fourth gas stream containing said basic nitrogen compound.

41. A process as in claim 40 wherein said fourth gas stream is contacted with said second gas stream.

42. A process as in claim 41 further comprising:
  (a) collecting said sulfur-containing solid; and
  (b) mixing the collected sulfur-containing solid with a carbon black.

43. A process as in claim 37 wherein said hydrosulfide is a mercaptan having from 1 to 6 carbon atoms and the dry sulfur-containing salt is selected from the group consisting of ammonium thiosulfate and diethylammonium thiosulfate.

44. A process comprising contacting a gaseous hydrosulfide represented by the formula RSH wherein R is a hydrocarbyl with a dry sulfur-containing salt to form a solid sulfur-containing composition.

45. A process as in claim 44 wherein the hydrosulfide is a mercaptan having less than about 7 carbon atoms.

46. A process as in claim 44 wherein the hydrosulfide is methyl mercaptan.

47. A process as in claim 44 wherein the sulfur-containing salt has a cationic portion selected from the group consisting of an alkali metal, an alkaline earth metal, a heavy metal, ammonium, alkyl ammonium and aryl ammonium, and an anionic portion selected from the group consisting of sulfite, thiosulfite, thiosulfate, trithionate, tetrathionate, pentathionate and hexathionate.

48. A process as in claim 44 wherein the sulfur-containing salt has a cationic portion selected from the group consisting of ammonium, alkyl ammonium and aryl ammonium, and an anionic portion selected from the group consisting of thiosulfite and thiosulfate.

49. A process as in claim 44 wherein the sulfur-containing salt is selected from the group consisting of ammonium thiosulfate and diethyl ammonium thiosulfate.

50. A process as in claim 47 wherein the hydrosulfide is contacted with the sulfur-containing salt in the presence of gaseous sulfur dioxide.

51. A process as in claim 50 wherein the hydrosulfide comprises a mercaptan having less than about 7 carbon atoms.

52. A process as in claim 51 wherein the mole ratio between the gaseous hydrosulfide and the gaseous sulfur dioxide is between about 0.2:1 and about 5:1.

53. A process as in claim 52 wherein the contacting occurs at a temperature above the dew point of water.

54. A process as in claim 53 wherein the mole ratio between the gaseous hydrosulfide and the gaseous sulfur dioxide is between about 0.7:1 and about 1.3:1.

55. A process as in claim 54 wherein the gaseous hydrosulfide comprises methyl mercaptan.

56. A process as in claim 55 wherein the sulfur-containing salt is selected from the group consisting of ammonium thiosulfate and diethyl ammonium thiosulfate.

* * * * *

UNITED STATES PATENT AND TRADEMARK OFFICE
CERTIFICATE OF CORRECTION

PATENT NO. : 4,308,242
DATED : December 29, 1981
INVENTOR(S) : Robert L. Horton

It is certified that error appears in the above-identified patent and that said Letters Patent is hereby corrected as shown below:

Column 14, line 46 (Claim 8, line 1) after "wherein" insert --- hydrogen sulfide is contacted with ---.

Column 15, line 16 (Claim 16, line 4) "hydrosulfide" should read --- hydrogen sulfide ---.

Column 16, line 33 (Claim 37, line 4) "hydrocarbly" should read --- hydrocarbyl ---.

Signed and Sealed this

Twenty-eighth Day of June 1983

[SEAL]

Attest:

GERALD J. MOSSINGHOFF

Attesting Officer

Commissioner of Patents and Trademarks